(12) United States Patent
Hodges et al.

(10) Patent No.: US 9,571,590 B2
(45) Date of Patent: Feb. 14, 2017

(54) SYSTEM AND METHOD FOR IMPROVED DETECTION AND MONITORING OF ONLINE ACCOUNTS

(75) Inventors: Daniel Hodges, San Francisco, CA (US); Joseph Anakata, Alameda, CA (US)

(73) Assignee: Location Labs, Inc., Emeryville, CA (US)

( * ) Notice: Subject to any disclaimer, the term of this patent is extended or adjusted under 35 U.S.C. 154(b) by 40 days.

(21) Appl. No.: 13/316,360

(22) Filed: Dec. 9, 2011

(65) Prior Publication Data

US 2012/0180135 A1    Jul. 12, 2012

Related U.S. Application Data

(63) Continuation-in-part of application No. 13/249,996, filed on Sep. 30, 2011, now Pat. No. 9,268,956.

(60) Provisional application No. 61/421,535, filed on Dec. 9, 2010, provisional application No. 61/421,554, filed on Dec. 9, 2010.

(51) Int. Cl.
| | |
|---|---|
| *G06F 15/173* | (2006.01) |
| *H04L 29/08* | (2006.01) |
| *G06Q 10/10* | (2012.01) |
| *G06Q 50/00* | (2012.01) |
| *H04L 29/06* | (2006.01) |

(52) U.S. Cl.
CPC ........... *H04L 67/22* (2013.01); *G06Q 10/10* (2013.01); *G06Q 50/01* (2013.01); *H04L 63/102* (2013.01); *H04L 67/306* (2013.01); *H04L 63/168* (2013.01)

(58) Field of Classification Search
CPC ..... H04L 67/22; H04L 67/306; G06F 17/3087
USPC .............................................. 709/223; 726/26
See application file for complete search history.

(56) References Cited

U.S. PATENT DOCUMENTS

| | | |
|---|---|---|
| 7,366,759 B2 | 4/2008 | Trevithick et al. |
| 7,849,502 B1 | 12/2010 | Bloch et al. |
| 7,869,792 B1 | 1/2011 | Zhou et al. |
| 7,899,704 B1 | 3/2011 | Thompson |
| 7,996,005 B2 | 8/2011 | Lotter et al. |
| 8,185,953 B2 | 5/2012 | Rothstein et al. |
| 8,279,808 B2 | 10/2012 | Sing et al. |
| 8,661,123 B2 | 2/2014 | Nishiyama |
| 8,682,995 B1 | 3/2014 | Lawler et al. |
| 8,788,657 B2 | 7/2014 | Hodges et al. |
| 8,825,759 B1 | 9/2014 | Jackson et al. |
| 8,935,245 B1 | 1/2015 | Cionca et al. |

(Continued)

OTHER PUBLICATIONS

Office Action dated Jul. 12, 2013 for U.S. Appl. No. 13/249,996.

(Continued)

*Primary Examiner* — Benjam M Thieu
*Assistant Examiner* — Andrew Woo
(74) *Attorney, Agent, or Firm* — Dovas Law, P.C.

(57) ABSTRACT

A computer-implemented monitoring and reporting method is provided. Identifying information is received corresponding to a user of a social networking application enabled by a social networking system. The social networking system is queried via a network for information corresponding to the user. The queried information is compared with predetermined criteria to determine a content category corresponding to the identifying information, and a report is provided including an indication of the determined content category.

40 Claims, 4 Drawing Sheets

(56) References Cited

U.S. PATENT DOCUMENTS

| | | | |
|---|---|---|---|
| 2002/0049806 A1* | 4/2002 | Gatz | G06F 21/62 709/203 |
| 2003/0126267 A1 | 7/2003 | Gutta et al. | |
| 2004/0111479 A1 | 6/2004 | Borden et al. | |
| 2004/0122681 A1 | 6/2004 | Ruvolo et al. | |
| 2007/0277224 A1 | 11/2007 | Osborn et al. | |
| 2008/0005325 A1* | 1/2008 | Wynn et al. | 709/225 |
| 2008/0066020 A1 | 3/2008 | Boss et al. | |
| 2008/0177834 A1* | 7/2008 | Gruhl | G06Q 10/00 709/204 |
| 2008/0270038 A1 | 10/2008 | Partovi et al. | |
| 2009/0024747 A1 | 1/2009 | Moses et al. | |
| 2009/0125499 A1* | 5/2009 | Cross | G06F 17/30197 |
| 2009/0260064 A1 | 10/2009 | McDowell et al. | |
| 2009/0327150 A1 | 12/2009 | Flake et al. | |
| 2010/0042684 A1 | 2/2010 | Broms et al. | |
| 2010/0077444 A1 | 3/2010 | Forristal | |
| 2010/0161369 A1 | 6/2010 | Farrell et al. | |
| 2010/0211694 A1* | 8/2010 | Razmov et al. | 709/242 |
| 2010/0246797 A1 | 9/2010 | Chavez et al. | |
| 2011/0047282 A1 | 2/2011 | Denman et al. | |
| 2011/0078036 A1 | 3/2011 | Cummings et al. | |
| 2011/0125844 A1* | 5/2011 | Collier et al. | 709/204 |
| 2011/0208822 A1* | 8/2011 | Rathod | G06Q 30/02 709/206 |
| 2011/0218884 A1 | 9/2011 | Kothari et al. | |
| 2011/0289161 A1 | 11/2011 | Rankin et al. | |
| 2012/0047448 A1* | 2/2012 | Amidon et al. | 715/753 |
| 2012/0047560 A1 | 2/2012 | Underwood et al. | |
| 2012/0102008 A1 | 4/2012 | Kaariainen et al. | |
| 2012/0151045 A1 | 6/2012 | Anakata et al. | |
| 2012/0151046 A1 | 6/2012 | Weiss et al. | |
| 2012/0151047 A1 | 6/2012 | Hodges et al. | |
| 2012/0180135 A1 | 7/2012 | Hodges et al. | |
| 2012/0201362 A1 | 8/2012 | Crossan et al. | |
| 2012/0233256 A1 | 9/2012 | Shaham et al. | |
| 2013/0141467 A1 | 6/2013 | Han et al. | |
| 2013/0282889 A1 | 10/2013 | Tito | |
| 2014/0095630 A1 | 4/2014 | Wohlert et al. | |
| 2014/0123043 A1 | 5/2014 | Schmidt et al. | |
| 2014/0280530 A1 | 9/2014 | Fremlin et al. | |
| 2014/0280553 A1 | 9/2014 | Hernandez et al. | |

OTHER PUBLICATIONS

Office Action dated Aug. 12, 2013 for U.S. Appl. No. 13/330,8708.
Office Action dated Mar. 12, 2013 for U.S. Appl. No. 13/308,697.
Office Action dated Sep. 27, 2013 for U.S. Appl. No. 13/308,697.
Office Action dated May 6, 2014 for U.S. Appl. No. 13/249,996.
Office Action dated Jun. 11, 2014 for U.S. Appl. No. 13/308,697.
Office Action dated Oct. 8, 2014 for U.S. Appl. No. 13/249,996.
Office Action dated Dec. 29, 2014 for U.S. Appl. No. 13/308,697.
Advisory Action dated Mar. 31, 2015 for U.S. Appl. No. 13/308,697.
"Net Nanny Parental Controls User Guide", 2007ContentWatch, Inc. http://www.netnanny.com/assets/documentation/nn/netnanny_56.pdf, pp. 53-60.
Office Action dated Apr. 13, 2015 for U.S. Appl. No. 13/249,996.
Office Action dated May 19, 2015 for U.S. Appl. No. 13/308,697.

\* cited by examiner

SYSTEM AND METHOD FOR IMPROVED DETECTION AND MONITORING OF ONLINE ACCOUNTS

CROSS REFERENCE TO RELATED APPLICATION(S)

This application is a continuation-in-part of U.S. patent application Ser. No. 13/249,996, filed Sep. 30, 2011, which claims the benefit of U.S. Provisional Patent Application No. 61/421,535, filed Dec. 9, 2010. This application further claims the benefit of U.S. Provisional Patent Application No. 61/421,554, filed Dec. 9, 2010. Application Ser. Nos. 13/249,996, 61/421,535, and 61/421,554 are incorporated by reference as if fully set forth.

BACKGROUND

This invention generally relates to computer network systems, and more particularly, to monitoring and detecting online accounts and online activities, especially monitoring activities of minors by their parents and guardians.

Software solutions to help parents monitor their children's online accounts, participation in social networks, and other online activity can be categorized into two groups: native solutions and cloud-based solutions. Native solutions generally rely on software agents that are downloaded and installed locally on a computer, router, or other local node through which Internet traffic passes, the Internet traffic is monitored as it passes through. Native solutions can monitor this traffic for photos, text, friend requests, visited sites, and any other online activity that parents would be curious about. Cloud-based solutions are not installed locally, but rather monitor a child's activity by accessing the contents of the child's account and activity stream via network-based communication with the relevant sites and services, for example making use of the fact that many online sites expose application programming interfaces ("APIs") to developers for this very purpose.

There are strengths and weaknesses to each approach. The native solution is very proficient at capturing all traffic that passes through it. However, the native solution is blind to traffic and activity that occurs elsewhere on the Internet. This is especially noticeable as children increasingly have access to the Internet from phones, computers at school, friends' houses, and other non-traditional access points that a parent might not be able to access for the purpose of installing software. In contrast, a cloud-based approach can work consistently no matter where a child is accessing the Internet from. However, a major weakness of cloud-based solutions is that their initial setup usually requires the parent to initially identity the child on any social networking accounts of interest. Services exist which discover a child's accounts based on an identifier like an email address, but these services are imperfect and still require the parent to correctly initiate the system with the child's email address. Furthermore, once an online account is identified, cloud-based solutions often need some form of cooperation from the child such as either their login credentials or permission to access their account via a social networking site's platform. Permission is necessary to access the contents of the child's account and the full extent of his or her online activity. What is needed is a method for monitoring minors' online activities in a more efficient and less cumbersome manner.

Privacy settings for social networking applications such as Facebook™ can be confusing and overwhelming. Even if a user invests the time to learn and manage the privacy controls available to them, some of these applications update their controls as they release new features or fine tune their policies. It would be desirable to facilitate user understanding of social networking application privacy settings.

SUMMARY

An embodiment according to the within invention comprises a computer implemented method that comprises providing an online-monitoring agent configured for local monitoring of a personal computing device, receiving identifying information associated with at least one of an account, email address, site, and service from the personal computing device via the online-monitoring agent, and monitoring via a network the at least one of the account, email address, site, and service based on the identifying information received via the online-monitoring agent.

Another embodiment according to the within invention further comprises that the personal computing device includes at least one of a laptop, personal computer, smartphone, router or other internet enabled device.

Another embodiment according to the within invention further comprises that the online-monitoring agent includes at least one of native software and cloud-based software.

Another embodiment according to the within invention further comprises that the native software includes at least one of at least one of a key-logger, peer-to-peer processor, remote redirection agent, and hyper text transfer protocol secure down-grader.

Another embodiment according to the within invention further comprises that the cloud-based software includes at least one of a collection server, a poller server, a proxy server and obfuscation-system.

Another embodiment according to the within invention further comprises that the hyper text transfer protocol secure down-grader comprises removing an automatic redirect if a targeted application server executes a HTTP redirect process, accessing the targeted application server website directly such that at least one website page and user information can be intercepted, rewriting the intercepted at least one website page and user information to retain a connection using HTTP.

Another embodiment according to the within invention further comprises that rewriting intercepted website pages and user information further includes at least one of rewriting POST uniform resource locators in a form to be HTTP instead of HTTPS, rewriting link uniform resource locators in pages to be HTTP instead of HTTPS, changing a HTTP BASE HREF to be HTTP instead of HTTPS and rewriting rules to circumvent specific website protections for websites having website specific login procedures.

Another embodiment according to the within invention further comprises that the HTTPS-down-grader further comprises the steps of tracking a uniform resource locator of each element that is down-graded, whether the down-grade occurred via handling redirects or by rewriting website page contents and storing the uniform resource locator into a uniform resource locator list.

Another embodiment according to the within invention further comprises that a proxy is configured for accessing a uniform resource locator list to determine if an outgoing connection to a targeted application server website should use HTTP or HTTPS to meet the security requirements of the targeted site such that when the uniform resource locator list indicates a HTTP level of security, the proxy server will access the targeted application server website via HTTP or when the uniform resource locator list indicates a HTTPS level of security, the proxy server will access the targeted application server website via HTTPS.

Another embodiment according to the within invention further comprises that the HTTPS-down-grader comprises sending intercepted at least one web page and user information from the down-grader to HTTP sessions, to the collection server.

Another embodiment according to the within invention further comprises that the intercepted user information includes at least one of usernames, passwords, e-mail addresses and uniform resource locators.

Another embodiment according to the within invention comprises a computer-implemented monitoring and reporting method according to an embodiment of the invention. Identifying information is received corresponding to a user of a social networking application enabled by a social networking system. The social networking system is queried via a network for information corresponding to the user. The queried information is compared with predetermined criteria to determine at least one content category corresponding to the identifying information, and a report is provided comprising an indication of the determined at least one content category.

The above and yet other objects and advantages of the within invention will become apparent from the hereinafter set forth Brief Description of the Drawings, Detailed Description of the Invention, and Claims appended herewith.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENTS

Figure 1:
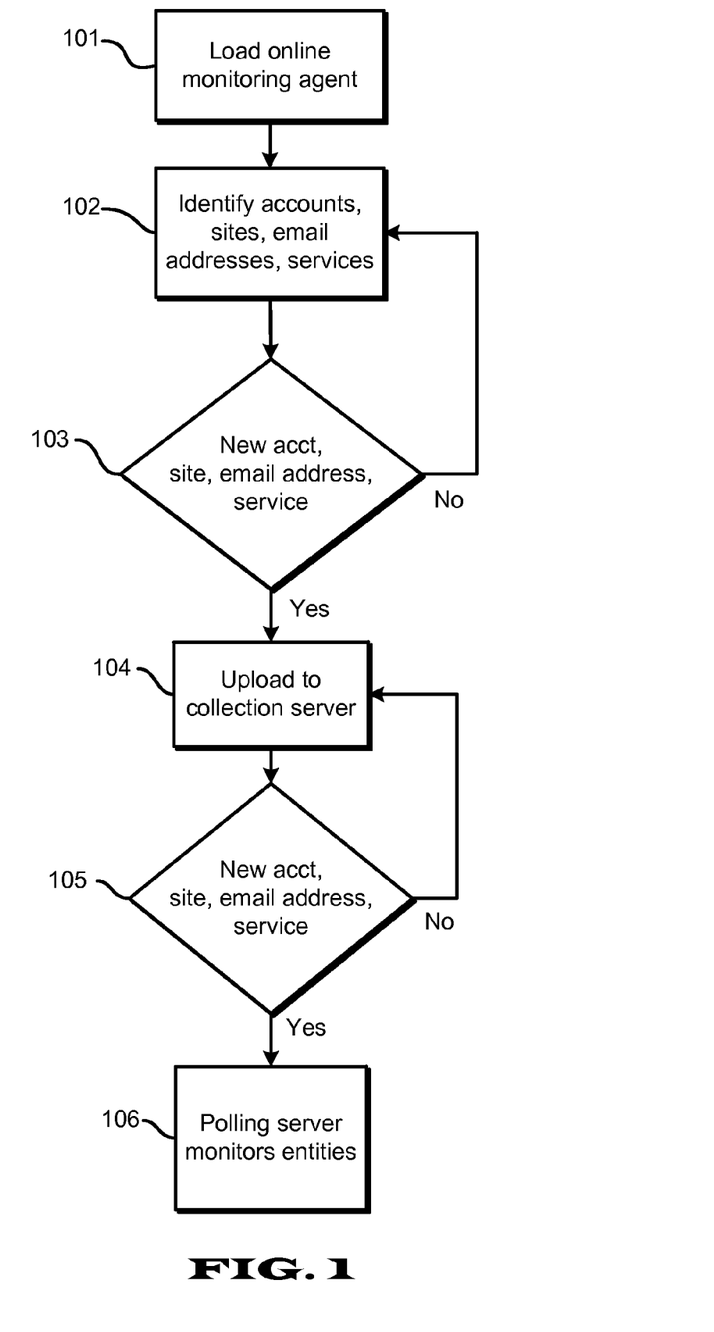
FIG. 1 illustrates a method for monitoring online accounts according to an embodiment of the within invention.

FIG. 1 illustrates a method for monitoring online accounts according to an embodiment of the within invention. A personal computing device such as a laptop, personal computer, smart-phone, router or other internet enabled device is loaded with an online-monitoring agent (Step 101). The online-monitoring agent comprises at least one of a keylogger, peer-to-peer processor, remote redirection agent, hyper text transfer protocol secure ("HTTPS") down-grader ("HTTPS-down-grader") also referred to as hyper text transfer protocol ("HTTP") defang and any other process that enable the tracking of data. The online-monitoring agent identifies which accounts, services, email addresses and sites the minor is using (Step 102). New identifying information is passed on to a cloud-based computer system, which preferably includes a collection server. The collection server monitors those accounts, sites and services (Step 103) in an ongoing manner, no matter where the minor is accessing those accounts, sites and services from. Meanwhile, each time the minor returns to one of the access points having the online-monitoring agent installed, that software continues to look for evidence of previously unknown accounts and email addresses, which can then be fed into the collection server (Step 104). A primary purpose of the collection server is to function as a common endpoint for all information collected. The information can include but is not limited to usernames, passwords, alternate e-mail addresses, visited website addresses to determine participation in anonymous forums and information gathered from components of the HTTPS-down-grader regardless of where those components reside, such as on end-user computers, residential gateways or a proxy server. If there is new information saved at the collection server, then that new information is picked up by a poller server (Step 105). The poller server periodically requests information about any monitored entities (Step 106). Monitoring levels vary depending on what information the collection server has on file for the monitored entities. In its simplest form the poller server polls publically available information on accounts such as on microblogging accounts that use 140 characters or less. More advanced functionality uses a username and password to log into a social networking site to determine newly added friends, check who the minor is corresponding with via private messages and other items of interest that are only accessible while logged in. The frequency of requests for different types of information may be tailored to meet a parent's or guardian's requirements. For example, since microblogging accounts that use 140 characters or less have account entries that are usually publically available, a parent may request querying for updates only once a day. However if the minor is frequently corresponding with newly added friends, monitoring frequency can be increased.

Another embodiment according to the invention comprises using the online-monitoring agent to obtain a minor's login credentials, so that those credentials can be fed back to a cloud-based system to enable direct access to the minor's online content and activity stream, without requiring direct participation or cooperation from the minor.

Another embodiment according to the within invention comprises an obfuscation-system that can generate alternate Internet protocol ("IP") addresses. The obfuscation-system can be used when a targeted application server has filters to prevent large numbers of connections for different users from a single IP address. The obfuscation-system will allow a system's hosted servers such as the collection server and poller server to originate connections to the targeted application server using the IP address of the minor's personal computing device. The obfuscation-system can handle connections for that specific minor or any number of other minors whose IP addresses are in a nearby network IP address block that is close to the minor's IP address.

Another embodiment according to the within invention comprises installing a HTTPS-down-grader in a proxy or on a residential gateway. The HTTPS-down-grader can function as a standard HTTP proxy configured by a user or the HTTPS-down-grader can function as a transparent proxy by intercepting traffic as it flows to a target site. A function of the HTTPS-down-grader is to process HTTPS connections to be down-graded to HTTP such that traffic can be monitored for usernames, passwords and other information such as web mail service, email addresses, and other user information that can be useful to have for monitoring the minor. Connections leaving the proxy destined for a targeted application server would still be encrypted via HTTPS if the original connection that was HTTPS-down-graded, was intended to be secure.

Figure 2:
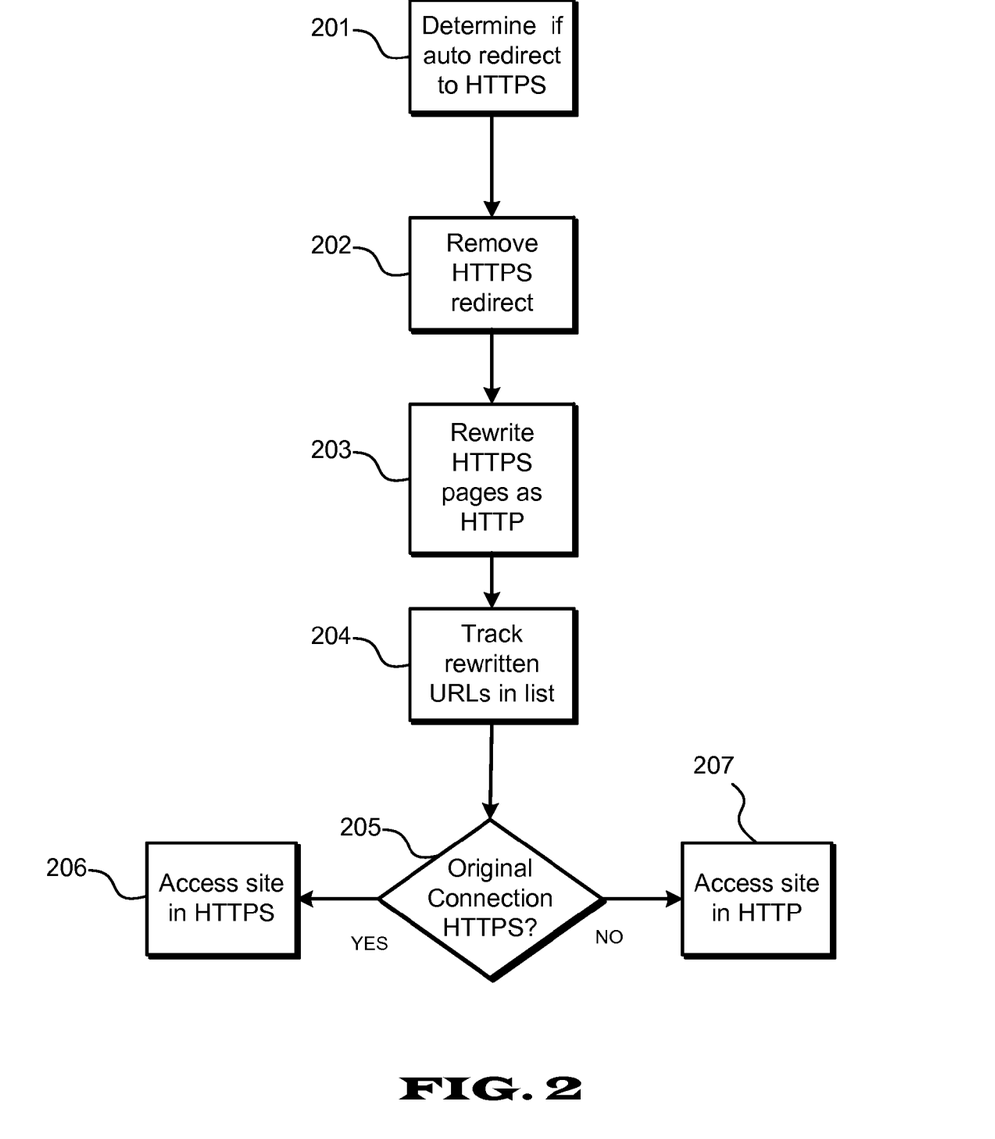
FIG. 2 illustrates a method for a HTTPS-down-grader according to an embodiment of the within invention.

FIG. 2 illustrates a method for a HTTPS-down-grader according to an embodiment of the within invention. If a targeted application server website does an automatic HTTP redirect process (Step 201), for example HTTP response status code 301 ("HTTP 301"), HTTP 302, HTTP 303 and HTTP 307, that upgrades a HTTP request to HTTPS, then the automatic redirect is removed (Step 202) and the targeted application server website is contacted directly so that the website page and user information can be intercepted. This would happen when a minor typed a bare domain name in an address bar of a browser but the targeted application server website uses HTTPS for all traffic. All intercepted website pages and user information will be rewritten to retain a connection using HTTP instead of HTTPS (Step 203). This applies whether the page being viewed was itself down-graded to HTTP such as in the case of a website having all content in HTTP but login/authentication is handled by a HTTPS based POST, or when the page itself was originally HTTP. Examples of rewriting include but are not limited to rewriting POST uniform resource locators ("URLs") in forms to be HTTP instead of HTTPS, to rewriting link URLs in pages to be HTTP instead of HTTPS, and changing a HTTP BASE HREF to be HTTP instead of HTTPS. Additionally, for sites with complicated login procedures or which fail to work with standardized procedures, website page specific rewriting rules can be added to circumvent those websites' protections as necessary. The HTTPS-down-grader will keep track of the URL of each element that is down-graded (Step 204) in a list, whether via handling redirects or by rewriting website page contents. When a proxy makes an outgoing connection, it will use the URL list to determine if the outgoing connection to the target site should use HTTP or HTTPS to meet the security requirements of the targeted site (Step 205). It will access the targeted application server website via HTTP when the URL list indicates a HTTP level of security (Step 206) or it will access the targeted application server website via HTTPS when the URL list indicates a HTTPS level of security (Step 207). Additionally the HTTPS-down-grader will send specified user information intercepted such as usernames, passwords, e-mail addresses and URLs, from the down-graded to HTTP sessions to the collection server.

Figure 3:
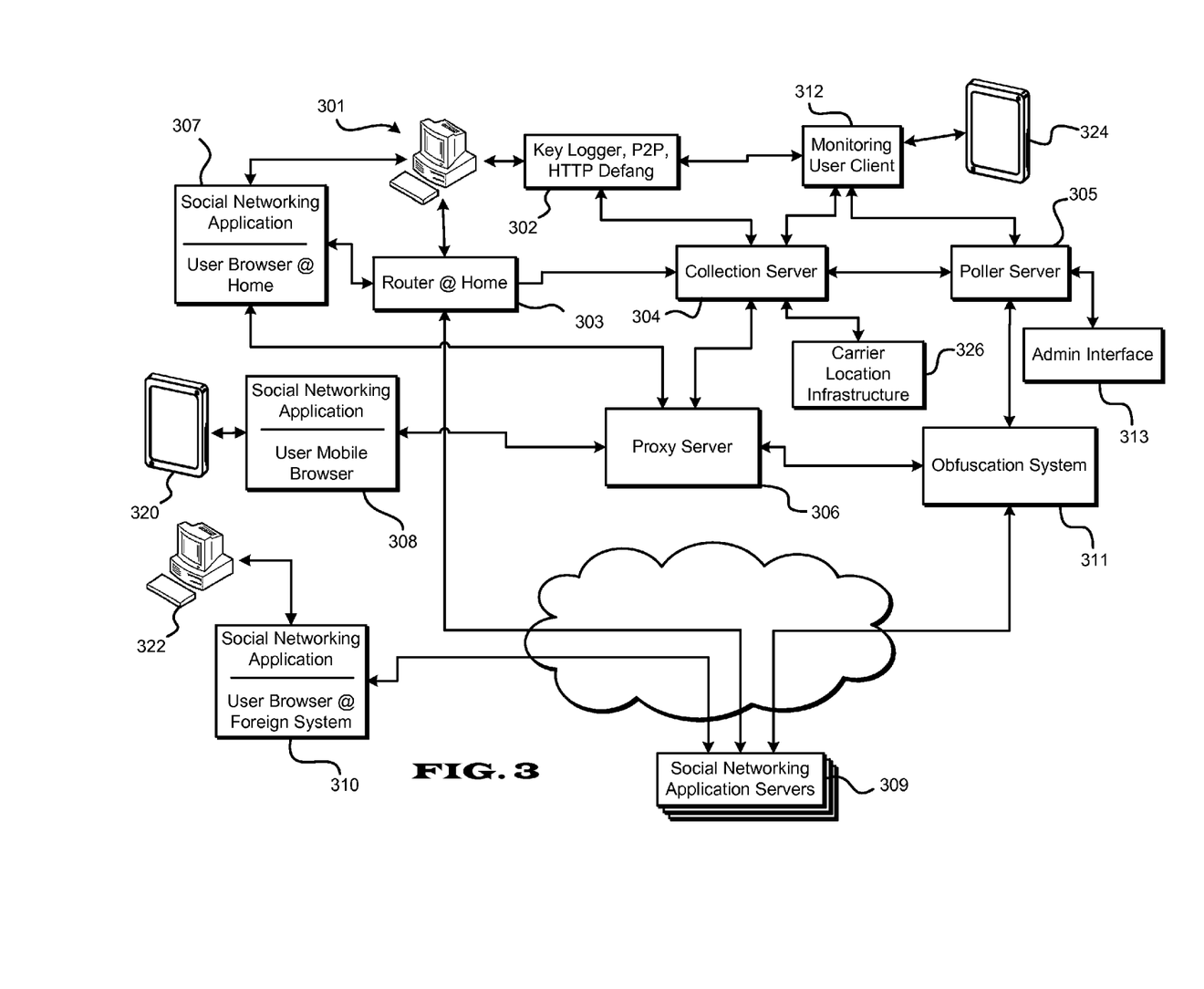
FIG. 3 illustrates a system for monitoring a minor's online activities according to an embodiment of the within invention.

FIG. 3 illustrates a system for monitoring a minor's online activities according to an embodiment of the within invention. A personal computing device 301 such as a personal computer, laptop, tablet, smart-phone or any other Internet accessible device is loaded with an online-monitoring agent 302 such as a key-logger, peer-to-peer processor, HTTPS-down-grader or any other software that can capture electronic user information. The online-monitoring agent 302 can alternatively be loaded onto a router 303 or other residential gateway. The personal computing device 301 can correspond for example to a computing device in the minor's home connected to the router 303.

The online-monitoring agent 302 or 303 collects and sends data to a collection server 304. The collection server 304 functions as a repository for a minor's electronic information such as usernames, device identifiers, email addresses and passwords. The collection server 304 is periodically polled for new and updated information by a poller server 305. A proxy server 306 including an HTTPS-down-grader interacts with browser access from a home browser 307, enabled for example by the personal computing device 301, or a mobile-browser 308, enabled for example by a smart-phone 320 operated by the minor targeted to a particular application server 309, to render accessible the minor's electronic user information to the collection server 304. The minor's user information can be collected for example during the minor's browser interactions with a social networking application (e.g. Twitter™, Facebook™) via a particular social networking application server 309. Alternatively for example, the minor's user information can be collected during interactions with a third party application (e.g. TweetDeck™, Plume™) which provides an alternate interface to the social networking application for example through an alternate application server configured for communication with the particular social networking application server 309.

The poller server 305 accesses information regarding a monitored minor from the social networking application servers 309, for example using user names, passwords or other user information provided by the collection server 304. The poller server 305 is configured to access information related to or inputted by a monitored minor on an application server 309 regardless of whether the information originates from the personal computing device 301, the home browser 307 executed on the device 301, the user mobile browser 308, or a foreign browser 310. The foreign browser 310, enabled for example by a foreign personal computing device 322, is a browser on an unrecognized system which can include for example a browser accessed by the minor residing on the minor's friend's computer, a public computer or other unrecognized system. The poller server 305 can access a minor's information on an application server 309 for example through connection to a publically accessible web interface, by logging on to the minor's social networking application account, or via an API exposed for the purpose of user monitoring. Alternatively, the online monitoring agent 302 or 303 can perform the functions of the poller server 305, connecting to the social networking application servers 309.

The poller server 305, or alternatively the online monitoring agent 302 or 303, provides status updates to monitoring users such as parents of a monitored minor at predetermined intervals or responsive to predetermined events. A monitoring user client 312, implemented for example on a suitable personal computing device 324, can interface with the poller server 305 and/or the online monitoring agent 302 or 303 to receive status updates regarding the minor's online activities. The status updates can include for example descriptions of postings by the minor or the minor's friends on particular social networking sites, indications of whether particular social networking sites are accessed by a device known by the poller server 305 and/or the online monitoring agent 302 or 303, and the times of such accesses. A status update can include an indication of an IP address from which a posting originated, or alternatively a geographic location from which a posting originated if the device from which the posting originated is location-enabled, for example a GPS-enabled smart phone.

If information extracted by the poller server 305 or the online monitoring agent 302 or 303 from a social networking application server 309 is determined not to correspond to activity of recognized systems recorded by the online monitoring agent 302 or 303 or the collection server 304, the status provided to the monitoring user client 312 can include an indication that a posting originated from an unknown device (i.e. foreign system). Alternatively, such status can be provided responsive to a determination that extracted information includes information corresponding to a system not recognized as associated with the monitored minor. The online monitoring agent 302 or 303 and/or the poller server 305 preferably maintain a listing of known devices corresponding to the minor for making such determination. The status provided to the monitoring user client 312 can include for example a statement such as "your child appears to be accessing Facebook™ from a device other than your home PC or his mobile phone" or "your child accessed Twitter™ from an unknown system at 4:00 pm".

If it is determined that the posting originated from an unknown device, for example the foreign personal computing device 322, the collection server 304 can query the location of a location-enabled mobile device known to be associated with the monitored minor, for example the smart phone 320. The collection server 304 can query the location of the location-enabled mobile device 320 directly or via a request to a telecommunication carrier location infrastructure 326. The collection server 304, or alternatively the online monitoring agent 302 or 303, provides a status to the monitoring user client 312 indicating that a particular social networking application was accessed by an unknown system at a particular time at a particular location. The status provided to the monitoring user client 312 can include for example a statement such as "your child accessed Twitter™ from an unknown system at 4:00 pm at or near 924 Spruce Street", or "your child accessed Facebook™ from an unknown system at 12:30 pm at or near Northern Public Library."

Some application servers have filters to prevent large numbers of connections for different users from a single IP address. An obfuscation-system 311 allows a system's hosted servers such as the collection server 304 and poller server 305 to originate connections to the targeted application server using the IP address of the minor's personal computing device. The obfuscation-system 311 can handle connections for that specific minor or any number of other minors whose IP addresses are in a nearby network IP address block that is associated with the minor's IP address. When necessary the obfuscation-system 311 can generate alternate IP addresses using a peer to peer process or any other system process suitable for generating IP addresses.

The collection server 304, poller server 305, proxy server 306 and obfuscation system 311 can be embodied by one or a plurality of physical systems and enabled by hardware, software or combinations thereof. The social networking application servers 309 can be executed on or enabled by any suitable number of systems or devices.

The system shown in FIG. 3 further enables a tool for informing a monitoring user about the privacy settings of a target social networking application user. The For example, the target may be a minor child and the monitoring user may be the minor child's parent. Alternatively, the monitoring user and the target may be a single user, for example a person who wants to gain a greater understanding of the privacy settings of one or more social networking applications he or she uses.

During an initilization process a monitoring user provides information to the system about a social network account of a target user. Referring to the system of FIG. 3, this information can be provided for example to the collection server 304 which enables a user interface via a client 312 operated by the monitoring user. The social network account can be identified explicitly, for example a URL unique to the target's profile, a username of the target, or login credentials for the target's account. Alternatively, the social network account can be identified by association, for example by using personally identifying information about the target such as name, email and/or phone number, which allows the system to search for the target's social network account via user discovery APIs provided by the social network or using a separate user discovery API or database corresponding to a system which aggregates user information. The monitoring user and the target can be the same person or can be two different people, for example a parent and his or her child.

Given the target's identified social network account, the poller server 305 can query a social network application server 309 for publicly available information about the target. For example, if the social network application provides an API, the poller server 305 can query the API for publicly available information about the target. Alternatively, the poller server 305 can query a social network application server 309 for information about the target by requesting a publicly available web page of the target via HTTP requests and then processing the resulting web page. Publicly available information includes information available to all users of the social network application.

The system, for example via a database on the collection server 304, configures a table of possible categories of content that may be publicly available on a particular social network. For example, if a particular social network enables users to enter an "about me" text blurb which can be made public, the system's table includes a corresponding entry for the "about me" category. Other categories can include for example message postings, event listings, photo postings, or other activities or communications enabled by the social network. The table entry includes criteria for identifying each category, so that the system can test for the presence of each content category in the target's publicly available information.

Each category has a numerical risk associated with it in the system's table. This enables the system to tally a risk score for the target, for example via the collection server 304, based on which content categories were found in the target's publicly available information on a particular social network. This score can be reported to a monitoring user via a user client 312.

Each content category in the table stores expository text to provide a monitoring user context for how that content category is used on the social network (e.g. "The About Me blurb provides users with an opportunity to introduce themselves to whoever may be viewing their profile. About Me blurbs are typically short and oftentimes strive to be witty.") Further text explains any default privacy settings for that content category explaining what persons or groups of persons are able to access content associated with a particular content category (e.g. "By default, About Me blurbs can be seen by anybody."). Further text explains privacy options for that content category, if any, indicating what persons or groups of persons can be selectively provided access to content associated with that content category (e.g. "Users do have the option to make the About Me blurb available only to friends."). Further text provides privacy considerations for the particular content category, including for example suggestions for disclosures in the particular content category (e.g. "Users can type anything they want into the About Me blurb, and should take care to avoid disclosing any sensitive or overly personal information.") Text further provides instructions for how to change the privacy setting for this content category, if applicable, for example using tools provided by the social networking application (e.g "Users can make their About Me blurb available only to friends by signing in to the social network and clicking the Settings link in the upper right corner. Users can edit the contents of the About Me blurb by clicking the Edit link found on their profile page.")

In this way, the system, for example via the collection server 304, can for example report to the monitoring user which content categories the target is making publicly available, an overall risk score associated with the target's current practices, and helpful tips and considerations, for example in the form of expository text, for each content category the target is choosing to make publicly available.

The system can also query the monitoring user via the collection server 304 for login credentials to access the monitoring user's own account on the social network, or can otherwise query the monitoring user to provide access to the monitoring user's account via APIs provided by the social network.

If the monitoring user is a different person than the target, and the monitoring user's is "connected to" or "friends with" the target on the social network, thereby providing the monitoring user access permission to the target's content on the social network), the system, for example via the poller server 305, can additionally access and query the target's shared information on the social network via the monitoring user's connection with the target. Again, the system is configured to process the accessed information to determine which content categories are being shared. By comparing content information available via accounts with access permissions regarding the target with publicly available information, for example by querying the social network via a first communication channel corresponding to a "friend's" account and a second, publicly accessible, communication channel, the system determines and reports on which content categories are being shared only with friends or other connected users with elevated access permissions and which content categories are publicly available. In some cases the social network may provide structured data, labels, or other indicators about how broadly each item is being shared (i.e. in which communication channels content categories are shared), which information can be collected by the system and used to make these determinations.

If the monitoring user is the same person as the target, or if the user can provide the target's login credentials, access the target's account, or otherwise act on behalf of the target, then the system can additionally access the target's shared information on the social network directly via the target's own account. This provides the system with the most extensive view of the entirety of the target's shared content and the corresponding privacy settings. In addition, with access to the target's account, the system can directly discern the target's current privacy settings, either via an API provided by the social network for this purpose, or by requesting relevant "Settings" web pages via HTTP requests to the social networking application servers 309 on behalf of the target and examining the returned web pages for indications of the target's current settings.

The tables, for example provided in a database accessible to the collection server 304, can be configured to match different numerical risks and different expository text for each content category based on the age of the target. Numerical risk assigned to a particular content category can be higher or lower depending on the age of the target. The age of the target can be supplied by the monitoring user, or can be determined from information on the social network, or can be supplied by another external system. The system can for example provide different notification to a monitoring user depending on the age of the target responsive to the discovery that the target is publicly sharing photos. The system can present the user numerical risk and expository text tailored to the target's age. The system tables can be further configured to match different numerical risks and different expository text for each content category based on the gender of the target, or other demographic characteristics of the target.

The system, for example via the poller server 305 can allow the monitoring user to register for an account to permit the monitoring user to have a recurring relationship with the system. The registration procedure can involve retrieving contact information from the monitoring user, or can involve setting up credentials (e.g. a username and password or an authentication platform like Facebook Connect™) for the monitoring user to access protected account-specific material. The system can then store an association between the monitoring user's account info and the target and corresponding social network account. The poller server 305 is preferably configured to periodically scan the social network as described above to examine which content categories the target is sharing and how. Each scan result can be compared with a previous scan result to determine changes in access permissions or privacy settings, for example whether any content categories are newly being shared by the target, wherein a report can provided to a monitoring user with a determination of a change in which communication channels particular content categories are shared from a previous scan.

The system is configured to send reports to the monitoring user at regularly scheduled intervals and/or when a new content category is detected. For example, the poller server 305 can provide the reports via the monitoring user client 312. Reports can be sent or viewed via a website, mobile website, mobile application or other suitable protocol. Reports can include a notification that a content category was detected, some or all of the expository text about that content category, and/or some or all of the retrieved content itself (e.g. sample pictures). Content can be pulled real-time from the site or service itself, for example the poller server 305 can pull a particular piece of content from a social networking application server 309 when the monitoring user is viewing the report via the monitoring user client 312), or can pull a copy from a temporary or permanent self-managed storage.

The system provides an interface for the monitoring user to mark any particular content category as a category that he or she desires to see removed from the information the target is sharing or otherwise change the communication channels in which the at least one content category is shared. The system can transmit expository text related to the marked content category to the target, either via their social network account or via contact information additionally supplied by the monitoring user, preferably including a suggestion or request that the target remove or modify the sharing protocol of the content category. Thereafter, the system preferably monitors whether or not the content category continues to appear in subsequent scans and report to the monitoring user on whether or not that content category continues to appear.

The system enables an interface for an administrator role to update the system's tables including adding, editing and removing content categories, numerical risks, and expository text, especially as new content categories are added to the social network or as the social network modifies its privacy settings and standard defaults. This permits a monitoring user to be warned about content categories showing up in the target's publicly shared information that did not exist at the time the monitoring user first registered their target with the system.

As described above, the system, for example via the poller server 305, is enabled to detect which content categories are being shared publicly on a network and which content categories are being shared with those granted special access permission by the target or other entity (e.g. a target's contacts or friends). The system is further configured to monitor for and report on the target's use (and non-use) of certain features within a social network or applications (e.g. games) within a social network's platform and determine in which communication channels the feature or application is operated. For example, the system can detect evidence that the target has discovered and is now using the social network's Groups feature (e.g. as evidenced by the target suddenly having a group affiliation as part of their social network profile information). The system can report the detection to the monitoring user and inform the user about the Groups feature, including possible privacy considerations (e.g. which communication channels the Groups feature is operated) or other threats the feature may pose. The system can further detect evidence that the target has discovered and is now using a certain game or application on the social network's platform (e.g. as evidenced by a status update from the game being published to the target's feed of status updates on their profile). At this point the system can report this to the monitoring user and inform the user about the game, including possible privacy considerations or other threats the game may pose. Again, the relationship between the monitoring user and the target can be that of a parent and child. Alternatively, the monitoring user and the target can be one and the same person, in which case the system helps the monitoring user understand the features, games, and applications he or she uses or inadvertently stumbles upon within the social network.

The system can provide a browser extension/plug-in operable with a browser application used by the target. For example, the collection server 304 can enable installation of software on the personal computing device 301 operable with the browser 307. The browser extension/plug in is configured to access and evaluate the target's shared content categories as a byproduct of the target's normal use of the social network.

The system enables the monitoring user to adjust reporting preferences. The monitoring user can assign or adjust the numerical risks (e.g. weights) given to individual content categories to affect which content categories the system alerts them about, and at what frequency or urgency.

Any given monitoring user can have multiple targets in the system. And any given target can have multiple accounts across multiple social networks.

Tallied risk scores can be converted into grades or other abstract representations (e.g. a scale composed of "very good", "good", and "at risk"). Scores, grades, and information about particular content categories can be reported alongside a comparison with national averages, local averages, averages from the target's peer group, or other basis to help the monitoring user understand what is how the target's social network application compares to behavior of the target's peers or other social networking application users.

The system can contain special content category tables tailored to specific use cases. For example, a "college admissions" table can contain numerical risks and expository text that is tailored to a target who is 16 to 18 years of age and likely in his or her final year or two of high school and is looking to apply to college. The report which is generated by comparing a target's publicly available content with the specified table helps the monitoring user understand what of the target's social network information is viewable by a college admissions offer and what might be done to help improve the target's chances of making a favorable impression. Other special reports can be tailored to a target who is searching for a job or a target with interest in joining the military. The system is configured to receive an indication of a demographic associated with the target (e.g. college prospect, military prospect) and assign to content categories numerical risks and expository text associated with the indicated demographic.

In addition to monitoring a particular social network for evidence of content categories, the system can also monitor other network locations where evidence of content categories may be available. For example, content that is shared publicly on some social networks can be accessible via web searches (e.g. cached and indexed via a Google™ web crawler) or may be pushed to another social network or publishing service (e.g. Twitter™) by the target or other entity. The system can monitor these alternative sources (e.g. searching for the target's profile and personal information on the Google™ search engine or monitoring the target's Twitter stream) for evidence of content categories being shared publicly. Such method is particularly applicable to social networks that enable location sharing, as they often have settings to allow one's location to be broadcast publicly to third party social network sites like Twitter™ or Facebook™. The system is configured to determine whether a target is using appropriate or monitoring user approved privacy settings when using a social network that involves location.

The system as described above preferably enables an application executable in a social networking application environment such as Facebook™, for example via a browser extension/plug-in enabled on a user's personal computing device, that teaches users including children or even adults about the social network application, controls, and online etiquette. A tip or lesson can be delivered daily, weekly or at any suitable time to the user.

For example, many social networking applications make use of a "friends of friends" concept in their privacy controls. This is not necessarily a natural concept readily understandable by users. The system enables a display for example that says "Did you know you have at least 10,420 so-called 'friends of friends'?", and provides some specific examples for the user.

The lessons can be configured to react to observed user behaviors. For example, upon a user's first use of Facebook™ Groups, a lesson can be sent (e.g. "We see you've discovered Groups. Here's what you should know."

An overview of privacy settings of a target user such as a child can be sent to the target user's parents or other monitoring users as part of an online monitoring solution. This overview can include raw data (e.g. your child shared these two photos publicly, this photo with just friends, and this video with just friends-of-friends). Alternatively, a summary can be provided, using words, tables, or charts (e.g. a bar graph showing how many public vs. friends-of-friends vs. friends-only items the target user posted during a week). Alternatively, a grade or rating on how private the subject user is in their information sharing, which can be based on the underlying raw data and a determination of what is appropriate or not for a user of a particular age.

Overseeing users can also be sent special alerts if the privacy settings for a particular piece of shared content, or the subject user's privacy habits in general, ever warranted closer examination.

A web-based tool can be provided for older subject users (e.g. high school juniors and seniors) to see what college admissions officers or military recruiting officers can see about them. The tool could draw attention to settings or content that may be likely to be bothersome or surprising to the target user. Help in improving the target user's profile can be provided via the tool.

Adults use social networking applications and, like children, can lack knowledge regarding the ever changing privacy controls available to them. Audits can be provided to adults to help them understand what information from their account is viewable by whom.

Figure 4:
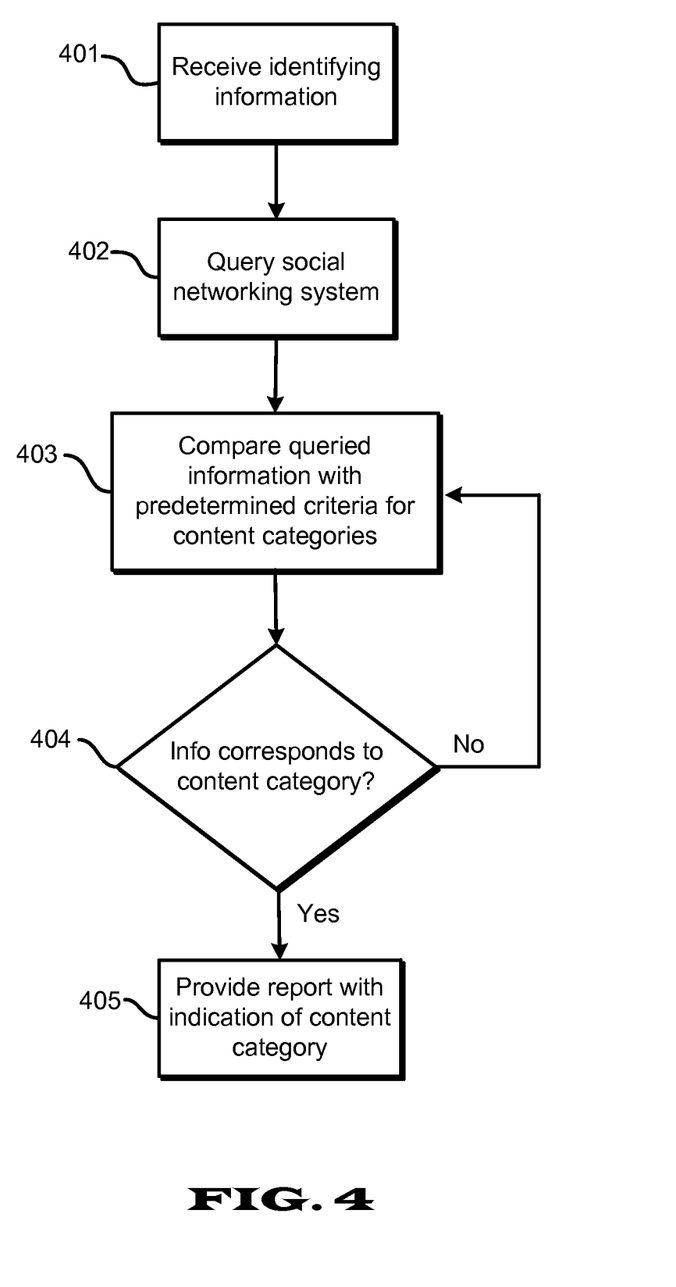
FIG. 4 illustrates a method for monitoring and reporting social networking application use according to an embodiment of the within invention.

Referring to FIG. 4, a diagram shows a computer-implemented monitoring and reporting method according to an embodiment of the invention. In step 401 identifying information is received corresponding to a user of a social networking application enabled by a social networking system. The social networking system is queried via a network for information corresponding to the user (step 402). The queried information is compared with predetermined criteria (step 403) to determine a content category corresponding to the identifying information (step 404), and a report is provided including an indication of the determined content category (step 405).

Having described embodiments of the invention, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A computer-implemented monitoring and reporting method for monitoring social networking application use of a first user based on instruction of a second user, the method comprising:
    receiving identifying information of the first user of a social networking application enabled by a social networking system;
    querying the social networking system via a network for information corresponding to the first user responsive to the instruction of the second user;
    comparing the queried information with predetermined criteria that identifies at least one content category to determine the at least one content category corresponding to the identifying information, the at least one content category corresponding to at least one of an activity or a communication enabled by the social networking system;
    querying at a first time instance and at a second time instance the social networking system to determine in which of a plurality of communication channels the at least one content category is shared, wherein a particular communication channel of the plurality of communication channels corresponds to at least one of a recipient or a recipient group;
    determining a change in which communication channels the at least one content category is shared from the first time instance to the second time instance; and
    providing a report to the second user responsive to the determined change in which communication channels the at least one content category is shared from the first time instance to the second time instance, the report comprising an indication of the determined at least one content category with the determined change of in which communication channels the at least one content category is shared.

2. The computer-implemented method of claim 1, further comprising receiving the identifying information as at least one of a name, a phone number or an electronic mail address of the first user.

3. The computer-implemented method of claim 1, further comprising accessing account information for the social first user based on the identifying information via an application program interface ("API") enabled by at least one of the social networking system or a system which aggregates user information.

4. The computer-implemented method of claim 1, further comprising transmitting HTTP requests via the network to the social networking system to access account information for the first user.

5. The computer-implemented method of claim 1, the method further comprising:
    receiving the identifying information from the second user.

6. The computer-implemented method of claim 1, wherein the queried information is publicly available via the network.

7. The method of claim 1, further comprising:
    assigning a numerical risk to the at least one content category;
    determining a risk score for the first user based on the numerical risk of the at least one content category, and
    providing the report to the second user further comprising the indication of the determined at least one content category with the risk score.

8. The computer-implemented method of claim 7, further comprising assigning the numerical risk to the at least one content category based on an age of the first user.

9. The computer-implemented method of claim 7, further comprising assigning the numerical risk to the at least one content category based on a gender of the first user.

10. The computer-implemented method of claim 7, wherein the at least one content category corresponds to a plurality of content categories, the method further comprising:
    assigning a numerical risk to each of the plurality of content categories, wherein the plurality of content categories correspond to a plurality of numerical risks;
    determining a risk score for the first user based on the plurality of numerical risks of the plurality of content categories.

11. The computer-implemented method of claim 7, the method further comprising:
    receiving a designation of the numerical risk associated with the at least one content category from the second user;
    assigning the numerical risk to the at least one content category responsive to the designation by the second user.

12. The computer-implemented method of claim 7, further comprising:
    assigning the numerical risk to the at least one content category based on a preference of the first user.

13. The computer-implemented method of claim 7, further comprising:
    comparing the risk score for the first user with a risk score for at least one other user of the social networking application to generate a risk score comparison; and
    providing the report with the risk score comparison.

14. The computer-implemented method of claim 13, wherein the at least one other user of the social networking application comprises a plurality of peers of the first user.

15. The computer-implemented method of claim 7, further comprising
    receiving an indication of a demographic associated with the first user; and
    assigning to the at least one content category at least one of a numerical risk or expository text based on the demographic; and providing the report based on the at least one of the numerical risk or the expository text assigned to the at least one content category.

16. The computer-implemented method of claim 1, further comprising providing the report with expository text corresponding to the at least one content category.

17. The computer-implemented method of claim 16, further comprising providing the expository text based on at least one of the age or the gender of the first user.

18. The computer-implemented method of claim 1, further comprising providing the report with an indication of a default privacy setting for the determined at least one content category indicating what persons or groups of persons are able to access content associated with the at least one content category in the associated default privacy setting for the at least one content category.

19. The computer-implemented method of claim 1, further comprising providing the report with an indication of privacy options indicating what persons or groups of persons can be selectively provided access to content associated with the determined at least one content category.

20. The computer-implemented method of claim 1, further comprising providing the report with privacy considerations for the at least one content category.

21. The computer-implemented method of claim 1, further comprising providing the report with instructions for changing the privacy settings of the at least one content category using the social networking application.

22. The computer-implemented method of claim 1, further comprising:
receiving login credentials for an account on the social networking system;
accessing the account on the social networking system via the corresponding login credentials; and
querying the social networking system for the information corresponding to the first user via the account.

23. The computer-implemented method of claim 22, further comprising:
providing an application on a local device corresponding to the first user; and
obtaining the login credentials via the application during use of the local device by the first user;
wherein the login credentials correspond to an account of the first user, wherein the social networking system is queried for information corresponding to the first user via the account corresponding to the first user.

24. The computer-implemented method of claim 22, wherein the login credentials correspond to the second user of the social networking system, wherein the social networking system is queried for the information corresponding to the first user via the account corresponding to the second user.

25. The computer-implemented method of claim 24, wherein the account corresponding to the second user of the social networking system comprises an access permission with relation to an account corresponding to the first user on the social networking system.

26. The computer-implemented method of claim 22, wherein the login credentials correspond to an account of the second user comprising an access permission with relation to an account corresponding to the first user of the social networking system, the method further comprising:
querying the social networking system for the information corresponding to the first user via the account corresponding to the second user;
querying the social networking system for the information corresponding to the first user via a publicly accessible communication channel;
comparing the information queried via the second user's account with the information queried via the publicly accessible communication channel to determine a difference between content categories accessible publicly and content categories available via the second user's account; and
providing the report with an indication of the difference between the content categories accessible publicly and the content categories available via the second user's account.

27. The computer-implemented method of claim 1, further comprising:
querying the social networking system via the plurality of communication channels to determine at least one difference in content categories accessible in different ones of the plurality of communication channels; and
providing the report with an indication of the difference in the content categories accessible in the different ones of the plurality of communication channels.

28. The computer-implemented method of claim 1, further comprising:
retrieving real-time content corresponding to the at least one content category from the social networking system; and
providing the report with the real-time content.

29. The computer-implemented method of claim 1, the method further comprising:
receiving from the second user an instruction to change the communication channels in which the at least one content category is shared; and
providing the instruction from the second user to the first user.

30. The computer-implemented method of claim 29, further comprising:
enabling an interface via the network for the second user to designate the at least one content category to provide the instruction; and
receiving the instruction via the second user's designation.

31. The computer-implemented method of claim 29, further comprising:
monitoring the social networking system to determine if the first user has complied with the instruction to change the communication channels; and
providing notification to the second user regarding whether the first user has complied with the instruction to change the communication channels.

32. The computer-implemented method of claim 1, further comprising:
querying the social networking system to determine a feature or an application used by the social networking system user via the social networking application;
determining at least one communication channel the feature or application is operated in; and
providing the report with an indication of the determined feature or application and an indication of the determined at least one communication channel.

33. The computer-implemented method of claim 1, further comprising:
enabling a browser extension/plug-in on a system operated by the first user; and
accessing the social networking system via the browser extension/plug-in to retrieve the information corresponding to the first user.

34. The computer-implemented method of claim 1, wherein the social networking system comprises a first system, the method further comprising querying a second system via the network for information corresponding to the first user.

35. The computer-implemented method of claim 34, wherein the second system comprises a search engine.

36. The computer-implemented method of claim 1, further comprising querying a plurality of social networking systems for the information corresponding to the first user.

37. The computer-implemented method of claim 1, wherein the information corresponding to the first user comprises location sharing information.

38. A computer activity monitoring and reporting system for monitoring social networking application use of a first user based on instruction of a second user comprising at least one computing system including at least one memory comprising instructions operable to enable the at least one computing system to perform a procedure comprising:
  receiving identifying information of the first user of a social networking application enabled by a social networking system;
  querying the social networking system via a network for information corresponding to the first user responsive to the instruction of the second user;
  comparing the queried information with predetermined criteria that identifies at least one content category to determine the at least one content category corresponding to the identifying information, the at least one content category corresponding to at least one of an activity or a communication enabled by the social networking system;
  querying at a first time instance and at a second time instance the social networking system to determine in which of a plurality of communication channels the at least one content category is shared, a particular communication channel of the plurality of communication channels corresponding to at least one of a recipient or a group of recipients of content;
  determining a change in which communication channels the at least one content category is shared from the first time instance to the second time instance; and
  providing a report to the second user responsive to the determined change in which communication channels the at least one content category is shared from the first time instance to the second time instance, the report comprising an indication of the determined at least one content category with the determined change of in which communication channels the at least one content category is shared.

39. A computer activity monitoring and reporting system for monitoring social networking application use of a first user based on instruction of a second user comprising at least one computing system including at least one memory comprising instructions operable to enable the at least one computing system to perform a procedure comprising:
  providing an application including an online monitoring agent for installation on a local device corresponding to the first user, the online monitoring agent configured to capture electronic identifying information;
  receiving from the online monitoring agent via a network electronic identifying information;
  querying, based on the instruction of the second user, a social networking application system for social networking information corresponding to the first user based on the electronic identifying information captured by the application installed on the local device;
  comparing the queried social networking information with predetermined criteria to determine at least one content category corresponding to the identifying information, the at least one content category corresponding to at least one of an activity or a communication enabled by the social networking system;
  querying at a first time instance and at a second time instance the social networking system to determine in which of a plurality of communication channels the at least one content category is shared, a particular communication channel of the plurality of communication channels corresponding to at least one of a recipient or a group of recipients of content;
  determining a change in which communication channels the at least one content category is shared from the first time instance to the second time instance; and
  providing a report to the second user responsive to the determined change in which communication channels the at least one content category is shared from the first time instance to the second time instance, the report comprising an indication of the determined at least one content category with the determined change of in which communication channels the at least one content category is shared.

40. The computer-implemented method of claim 39, wherein the identifying information comprises information posted by the first user on the social networking system.

* * * * *